(12) United States Patent
Berra Colín

(10) Patent No.: US 11,627,841 B2
(45) Date of Patent: Apr. 18, 2023

(54) MULTIFUNCTIONAL TOOL FOR HOLDING AND MANIPULATING HOT ITEMS AND PRODUCTS

(71) Applicant: GRUPO ROLANS, S.A. DE C.V., Metepec (MX)

(72) Inventor: Agustín Berra Colín, Guadalajara (MX)

(73) Assignee: GRUPO ROLANS, S.A.S DE C.V.

( * ) Notice: Subject to any disclaimer, the term of this patent is extended or adjusted under 35 U.S.C. 154(b) by 107 days.

(21) Appl. No.: 17/417,370

(22) PCT Filed: Aug. 8, 2019

(86) PCT No.: PCT/MX2019/000090
§ 371 (c)(1),
(2) Date: Jun. 22, 2021

(87) PCT Pub. No.: WO2021/025549
PCT Pub. Date: Feb. 11, 2021

(65) Prior Publication Data
US 2022/0015582 A1    Jan. 20, 2022

(30) Foreign Application Priority Data

Aug. 2, 2019   (MX) .................. MX/u/2019/000379

(51) Int. Cl.
*A47J 45/10*   (2006.01)
*A47J 43/28*   (2006.01)

(52) U.S. Cl.
CPC ............. *A47J 45/10* (2013.01); *A47J 43/288* (2013.01)

(58) Field of Classification Search
CPC .......... A47J 45/10; A47J 43/288; A45F 5/102
(Continued)

(56) References Cited

U.S. PATENT DOCUMENTS

| 1,179,976 | A | * | 4/1916 | Stroway | .................. | A47J 45/10 |
| | | | | | | 294/29 |
| 1,541,738 | A | * | 6/1925 | Peyton | .................... | A47J 45/10 |
| | | | | | | 294/29 |

(Continued)

FOREIGN PATENT DOCUMENTS

| CN | 10803409 | 5/2018 |
| GB | 294093 | 7/1928 |

(Continued)

*Primary Examiner* — Paul T Chin

(57) ABSTRACT

A multifunctional tool for holding and handling hot items and products is described. The tool has a horizontal support section. A vertical gripping section is at one end of the horizontal support section. An upper end of the vertical gripping section has a hook element. A pair of arms project downwards from the horizontal support section. A reinforcement section also functions as a second gripping section. The reinforcement section is fixed to ends of the arms and extends diagonally until it joins an end edge of the horizontal support section. A covering layer of thermal insulating material is attached from a top of the hook element, through the vertical gripping section and to the underside of the horizontal support section whereby a gripping surface is defined for the user. The gripping surface allows the user to avoid direct contact with the tool and thus avoid contact with hot parts, items or products that will be grasped by the tool.

6 Claims, 5 Drawing Sheets

(58) Field of Classification Search
USPC .................................. 294/29, 27.1, 31.1, 33
See application file for complete search history.

(56) References Cited

U.S. PATENT DOCUMENTS

| | | | | |
|---|---|---|---|---|
| 1,595,469 | A * | 8/1926 | Irving | A47J 45/10 |
| | | | | 294/31.1 |
| 1,669,355 | A * | 5/1928 | Spurgeon | A47J 45/10 |
| | | | | 294/31.1 |
| 3,010,688 | A * | 11/1961 | Serio | A47J 45/072 |
| | | | | 248/688 |
| 4,366,596 | A | 1/1983 | Hellinger et al. | |
| 4,846,518 | A * | 7/1989 | Hamel | A63H 3/003 |
| | | | | 446/268 |
| 6,494,513 | B2 * | 12/2002 | Worthington | B65G 7/12 |
| | | | | 294/92 |
| D542,608 | S * | 5/2007 | Romsburg | D7/688 |
| 8,915,526 | B1 * | 12/2014 | Ott | A47J 45/10 |
| | | | | 294/12 |
| 9,545,749 | B2 * | 1/2017 | Feng | B29C 48/022 |
| 9,675,166 | B2 * | 6/2017 | Mick | H04W 88/02 |
| 2004/0174028 | A1 | 9/2004 | O'Bannon | |
| 2013/0098930 | A1 | 4/2013 | Ong | |
| 2015/0108141 | A1 * | 4/2015 | Sullivan, Jr. | A47J 45/10 |
| | | | | 220/573.1 |

FOREIGN PATENT DOCUMENTS

| | | |
|---|---|---|
| GB | 413790 | 7/1934 |
| GB | 2421678 | 7/2006 |
| GB | 2494901 | 3/2013 |
| JP | 10323287 | 12/1998 |

* cited by examiner

MULTIFUNCTIONAL TOOL FOR HOLDING AND MANIPULATING HOT ITEMS AND PRODUCTS

FIELD OF THE INVENTION

The present invention relates to devices, accessories, or tools for holding and handling high temperature (hot) items to avoid burns. More specifically, it refers to a multifunctional tool for holding and handling hot items and products that prevents burns and facilitates safer maneuverability and handling.

BACKGROUND OF THE INVENTION

There are different circumstances or processes that require subjecting items or products to high temperatures and require manual handling of said items, in these cases it is necessary to use a tool with thermal insulating material that allows a user to manipulate the products without heat transfer and thus avoid burns. An example of this is bread trays that are subjected to high temperatures to bake bakery products.

In the breadmaking process, once the bread has been baked, it is necessary to remove from the oven the trays in which the bread is located. Because these trays are at high temperatures, to avoid burns and to be able to hold them to remove them, it is necessary to use a device that is made of heat insulating material.

Gloves or cloths are normally used to carry out this action, but these have a very short useful life, so they must be changed frequently and sometimes after several times of use, they can be contaminated and therefore contaminate the bread or food that is being baked.

However, there are no known devices that allow holding containers that may be at a high temperature and comprising a handle with thermal insulation to prevent heat transfer.

A search was carried out to determine the closest state of the art, finding the following information.

The document JPH10323287 by Morimoto Shozo et al, of May 26, 1997 was found, revealing an insulating handle, which prevents a hand from being burned when a person touches a thermal insulating part, the heat insulating part being formed between a holding part of the heater and the wall face of the heater and forming a vertically open groove in the heat insulating part. The handle 3 for a heater, for example, attached to a device body 1 of a hot plate through the adjustment metal 2, a clamping part 5 projects to a part opposite the device body 1 so that the fingers can be inserted between a thermal insulating part 4 and the retaining part 5 to hold the retaining part. A vertically open slit 7 is formed in the thermal insulating part 4. The groove is thus formed in the thermal insulating part 4 and the thermal insulating part 4 is divided into the inner part 4a and the outer part 4b by the groove 7. This constitution can protect the heat conduction through the slot 7, when the inner part 4a is heated by the heat conduction or heat radiation of the device body 1, to prevent the heat from being directed to the outer part 4b.

However, this invention relates to a handle that is attached to a heating device and is not adapted for use on different items and products.

Document CN108034094 was also found, which reveals a rubber heat insulating heat preservation material without elemental sulfur characterized by comprising the following components in parts by weight: nitrile rubber, polyvinyl chloride, chlorinated polyethylene, azodicarbonamide, antimony oxide, N'-m-phenylene bismaleimide, talcum powder, dioctyl phthalate, zinc oxide, carbon black, an anti-aging agent, an accelerator, chlorinated paraffin, aluminum hydroxide, epoxy soybean oil, polyethylene glycol, paraffin and stearic acid. The invention further provides a method of preparing the sulfur-free elemental rubber thermal insulating heat preservative material. The elemental sulfur-free rubber thermal insulating heat preservation material provided by the invention is free of elemental sulfur, it is harmless to human bodies, it does not present damage to the atmosphere in the environment, it is free of corrosion in metal pipes, and, in addition, it is good in thermal insulation properties.

However, this invention only refers to a thermal insulating material, but not to a device that allows holding trays or other items to remove them when they are at high temperatures.

Document U.S. Pat. No. 4,366,596 was also located which describes a one piece thermal insulating cover for a closed loop cookware handle with a body of rubber resistant elastic material with low thermal conductivity with a hilt portion to substantially surround the utensil handle and a protection portion that is adjacent to a utensil main body portion between the utensil handle and the main body when the hilt portion is in position on the utensil handle, so that the protective portion provides a barrier to prevent the user hand from coming into contact with the body of the utensil when gripping the hilt part. The hand grip portion is formed as a generally U-shaped hollow tubular member, with the protective portion extending between the ends of the U and with the hollow tubular member being cut along one edge thereof between the ends of the U to facilitate placement and removal of the tubular member over the handle. This groove can be joined by a rib and groove clamping arrangement to keep the groove closed when the hilt is in position on a utensil handle.

However, this patent refers to a handle that is for kitchen utensils and cannot be adapted for other utensils.

As can be seen, no device is adapted and configured to extract the bread trays optimally during the breadmaking process or other items or products that are subjected to high temperatures, without suffering burns and requiring manual handling.

Likewise, during the breadmaking process, it is necessary to manipulate the shelves that contain the trays in which the bread is placed, and likewise, the shelves can be at high temperatures so that in the same way, a device comprising an area with thermal insulating material would be used. Hooks are usually used for this.

Also, spatulas are commonly used to remove the bread from the trays. To carry out these three actions, remove trays, manipulate shelves, and unmold the bread during the breadmaking process, different devices are usually used, the present invention provides a device that comprises elements that allow these three actions to be carried out.

OBJECTIVES OF THE INVENTION

The main objective of the present invention is to make available a multifunctional tool for holding and handling hot items and products that allows holding and handling bread trays when baking or some other hot item in an optimal and simple way avoiding heat transfer.

Another objective of the present invention is to provide said multifunctional tool for holding and handling hot items and products that, being made of stainless steel, have greater durability.

Another objective of the present invention is to make available said multifunctional tool for holding and handling hot items and products that is adapted and configured to be used optimally and easily in products with different shapes, for example, bread trays and also shelves. where these trays are placed.

Another objective of the present invention is to provide said multifunctional tool for holding and handling hot items and products that one of its elements allows to unmold or detach materials adhered to the trays, such as bread, so as not to need additional elements.

Another objective of the present invention is to make available said multifunctional tool for holding and handling hot items and products that comprises a food-grade, heat-insulating coating so as not to contaminate bread or any other food.

Another objective of the present invention is to provide said multifunctional tool for holding and handling hot items and products that offers greater comfort and improves protection during the performance of production tasks.

And all those qualities and objectives that will become apparent when making a general and detailed description of the present invention supported by the illustrated embodiments.

BRIEF DESCRIPTION OF THE INVENTION

In general, the multifunctional tool for holding and handling hot items and products in accordance with the present invention consists of a substantially horizontal support section that at one end comprises a substantially vertical gripping section at the upper end of which a hook element is defined; said substantially horizontal support section comprises on its lower face a pair of arms projecting perpendicularly downwards, the ends of which are fixed in a second reinforcing section that also defines a second gripping section that extends diagonally until it joins the lower face of the end edge of said substantially horizontal support section opposite to the area where said vertical gripping section is comprised. An overlay layer of thermal insulating material is attached from the top of the hook element, through the substantially vertical gripping section and to the underside of the substantially horizontal support section where a gripping surface is defined for the user to avoid direct contact with the tool and thus avoid contact with hot parts, items or products that will be grasped by said tool.

In a first use embodiment of the invention, said vertical gripping section that defines a hook element at its upper end is held by the user so that the thumb of the hand is arranged in the upper area of hook element, and the palm together with the rest of the fingers of the hand extend towards the lower face of the substantially horizontal support section where the hook element holds the edge of the perimeter wall of a tray or the like in which products are arranged that are subjected to high temperatures inside ovens or other heating means such as bakery products and the substantially horizontal support section is arranged on the lower face of the tray or similar item in a way that generates a support point, the hook element holding the upper edge of the perimeter wall and the user can easily manipulate a tray with one hand, for example for bakery products.

In another use embodiments of said tool, the second reinforcement section that defines a second gripping section and joins to the pair of arms projected perpendicularly downwards, acts as a gripping element by the user and the substantially vertical gripping section where the hook element is defined allows to hold the vertical posts of the shelves of metallic material or other material that are subjected to high temperatures when placed inside ovens or other areas conceived to receive high temperatures and cook food products. The upper face of said gripping and reinforcing section comprises a covering layer of thermal material to avoid direct contact and heat transfer to the user hand.

This tool is configured to be able to hold different products or items that are subjected to high temperatures and must be manipulated by users with their hands, and it is multifunctional since different products or items can be held and manipulated and no more tools are needed and avoids burns when incorporating covering layers of thermal insulating material.

In the preferred embodiment of the invention, the thermally insulating material is HT Thermoplastic Rubber (HT for its acronym in English "high temperature") thermally formed with an operating temperature of −5° C. to 120° C.

In other embodiments of the invention, said substantially horizontal support section, in addition to serving as a means of rest and support for trays or similar products, defines an end edge that can serve as a spatula to detach or unmold material adhered to the trays, for example bread, cakes or other products that are stuck.

In the preferred embodiment, the multifunctional tool for holding and handling hot items and products is made of food grade stainless steel, although it can be made of other materials that are optimal to perform their functions at high temperatures and are suitable for receiving by means of an adhesive or another bonding means a coating of thermal insulating material.

To better understand the characteristics of the invention, the present description is accompanied as an integral part thereof by the drawings which are described below with an illustrative but non-limiting character.

Figure 1:
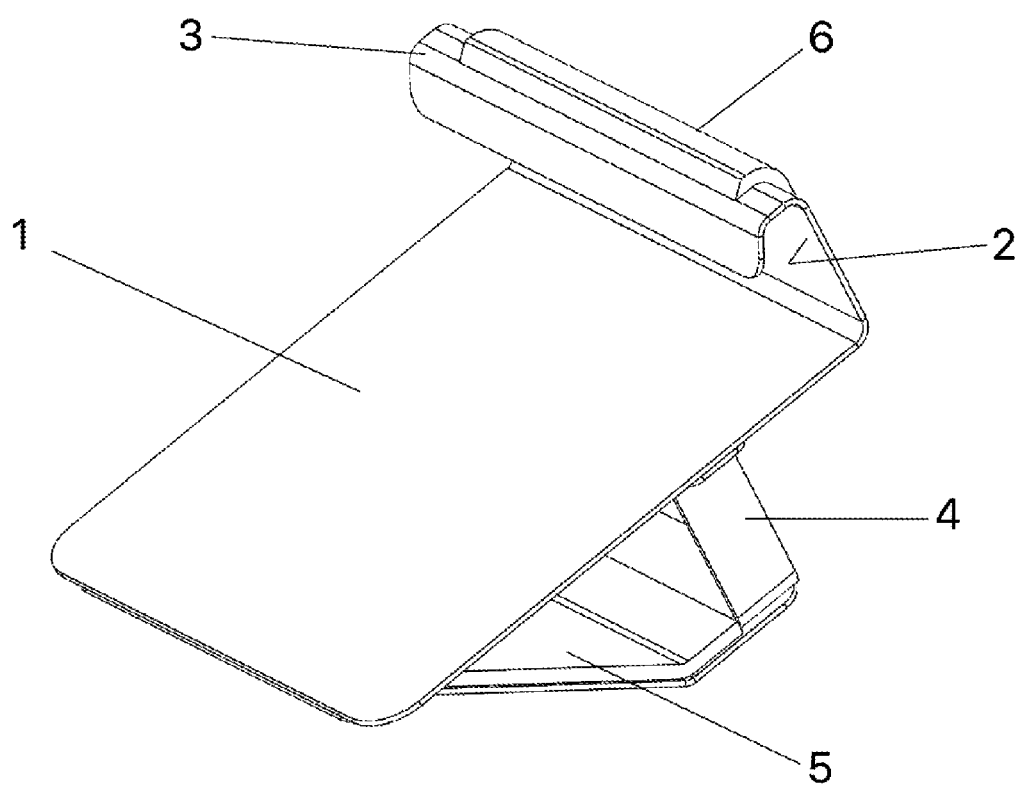
FIG. 1 shows a conventional perspective view of the multifunctional tool for holding and handling hot items and products.

For a better understanding of the invention, a detailed description of some embodiments thereof will be made, shown in the drawings that for illustrative but non-limiting purposes are attached to the present description.

DETAILED DESCRIPTION OF THE INVENTION

The characteristic details of the multifunctional tool for holding and handling hot items and products are clearly shown in the following description and in the accompanying illustrative drawings, the same reference signs serving to indicate the same parts.

Figure 2:
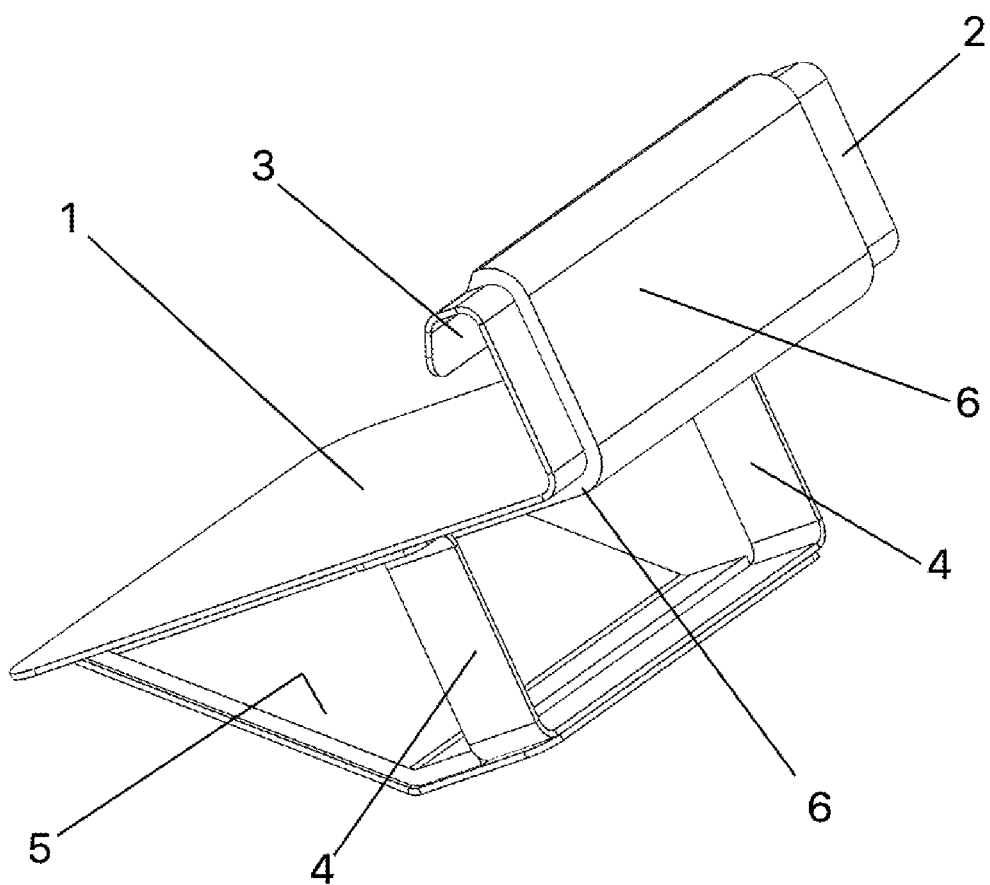
FIG. 2 shows a rear perspective view of the multifunctional tool for holding and handling hot items and products.

Referring to FIGS. 1 and 2, the multifunctional tool for holding and handling hot items and products consists of a substantially horizontal support section (1) which at one end comprises a substantially vertical gripping section (2) at the upper end of which a hook element (3) is defined; wherein said substantially horizontal support section (1) comprises on its lower face a pair of arms (4) projecting perpendicularly downwards, the ends of which are fixed in a second reinforcing section (5) that also defines a second gripping section and extending diagonally to join at the lower face of the end edge of said substantially horizontal support section (1). A covering layer of thermal insulating material (6) is attached from the upper part of the hook element (3), passing through the substantially vertical gripping section (2) and to the lower face of the substantially horizontal support section (1) where a gripping surface is defined for the user to avoid direct contact with the tool and thus avoid heating of the gripping areas and therefore burns are avoided; furthermore, the tool avoids direct contact with hot parts, items or products that will be grasped with said tool.

Figure 3:
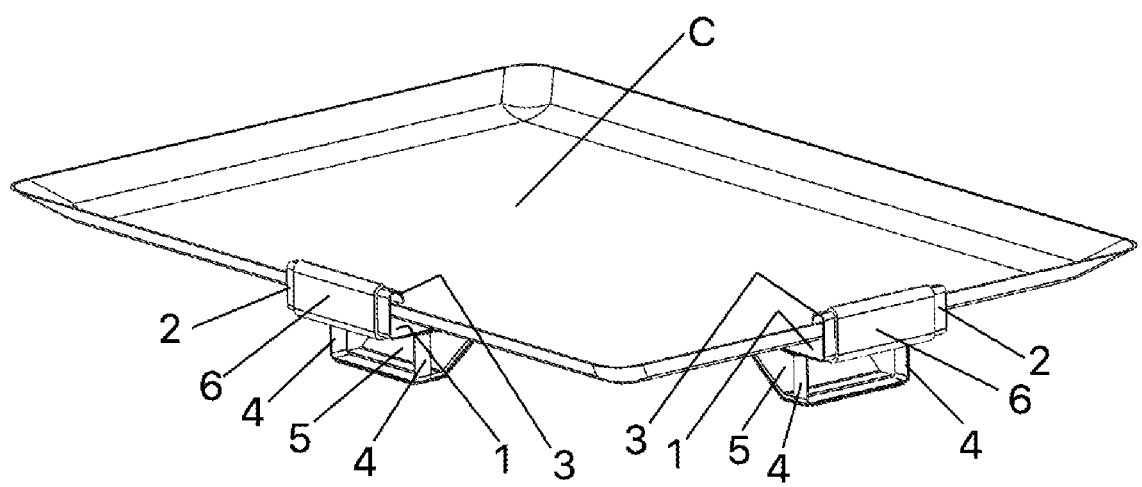
FIG. 3 shows a conventional perspective view of the first use embodiment of the multifunctional tool for holding and handling hot items and products, in this case it is shown how a tray is held.
Figure 4:
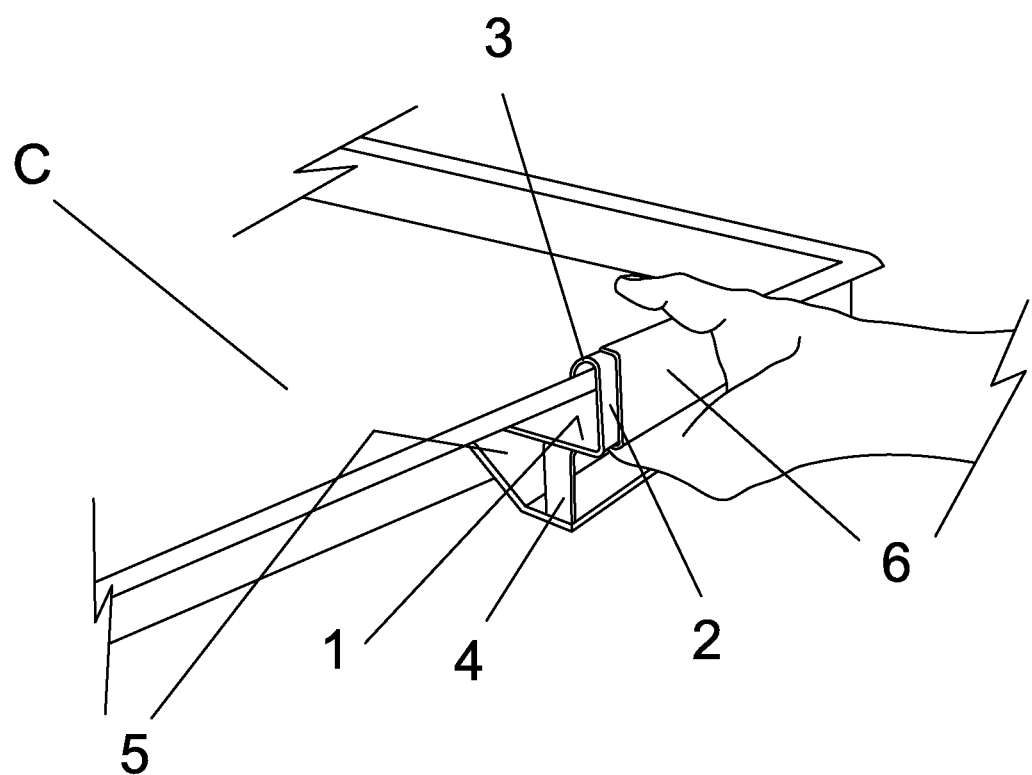
FIG. 4 shows a conventional perspective view of the use embodiment of the multifunctional tool for holding and handling hot items and products, as shown in FIG. 3.

Referring to FIGS. 3 and 4, in a first use of the tool, said vertical gripping section (2) that defines at its upper end a hook element (3) is held by the user so that the thumb of the hand is arranged in the upper area of hook element (3), and the palm together with the rest of the fingers of the hand extend towards the lower face of the substantially horizontal support section (1) where the hook element (3) holds the edge of the perimeter wall of a tray (c) or the like in which products that are subjected to high temperatures are placed inside ovens or other heating means such as bakery products; and wherein the substantially horizontal support section (1) is arranged on the underside of the tray (c) or similar item so as to generate a support point. The hook element (3) holds the upper edge of the perimeter wall and the user can easily manipulate with one hand a tray (c) for example for bakery, pastry, or other food products.

Figure 5:
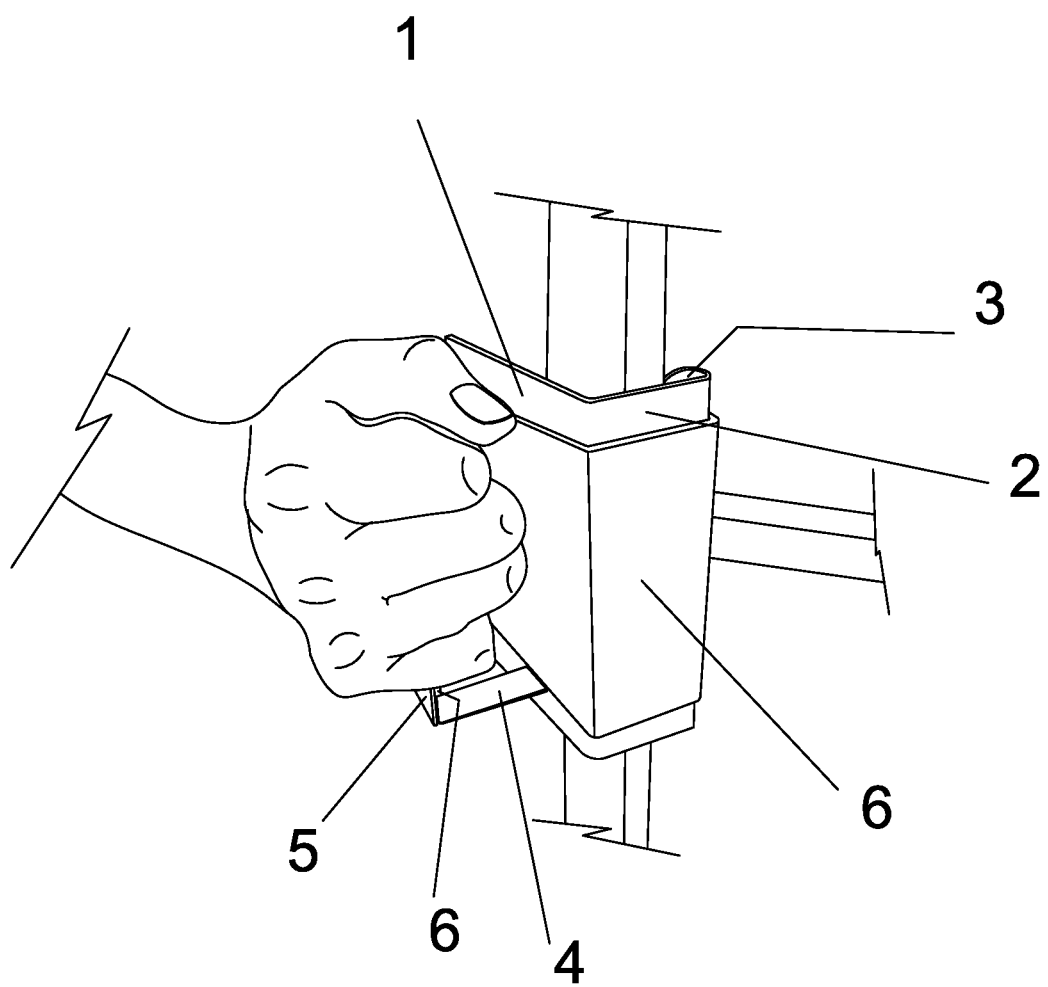
FIG. 5 shows a conventional perspective view of the second use embodiment of the multifunctional tool for holding and handling hot items and products.

Referring to FIG. 5, the second reinforcement section, which defines a second gripping section (5) and which joins the pair of arms (4) projected perpendicularly downwards, acts as a gripping element by the user and the substantially vertical gripping section (2), where the hook element (3) is defined, allows to hold the vertical posts of the shelves made of metallic material or other material that are subjected to high temperatures when placed inside ovens or other areas conceived to receive high temperatures and cook food products. The upper face of said gripping and reinforcing section (5) comprises a covering layer of thermal material (6) to avoid direct contact and heat transfer towards the user hand.

The invention has been sufficiently described so that a person of ordinary skill in the art can reproduce and obtain the results mentioned in the present invention. However, any person skilled in the field of the art to which the present invention corresponds, may be able to make modifications not described in the present application, however, if for the application of these modifications in a certain structure or in the manufacturing process of the same, the matter claimed in the following claims is required, said structures should be included within the scope of the invention.

Having sufficiently described the invention, the content of the following claim clauses is claimed as property:

1. A multifunctional tool for holding and handling hot items and products, comprising:
    a horizontal support section having an underside;
    a vertical gripping section at one end of the horizontal support section, the vertical gripping section having a hook element at an upper end of the vertical gripping section, the hook element having a top;
    a pair of arms that project downward from the horizontal support section;
    a reinforcement section that also functions as a second gripping section, the reinforcement section being fixed to ends of the arms, and the reinforcement section extending diagonally to join an end edge of said horizontal support section; and
    a covering layer of thermal insulating material attached from the top of the hook element, through the vertical gripping section and to the underside of the horizontal support section whereby a gripping surface is defined for the user.

2. The multifunctional tool for holding and handling hot items and products according to claim 1 characterized in that an upper surface of said reinforcement section comprises a covering layer of thermal insulating material whereby heat transfer associated with direct contact to the user is avoided.

3. The multifunctional tool for holding and handling hot items and products according to claim 2, characterized in that the thermal insulating material is thermoformed thermoplastic rubber.

4. The multifunctional tool for holding and handling hot items and products according to claim 1, characterized in that the thermal insulating material is thermoformed thermoplastic rubber.

5. The multifunctional tool for holding and handling hot items and products according to claim 1, characterized in that said end edge of said horizontal support section functions as a spatula to detach or unmold adhered material.

6. The multifunctional tool for holding and handling hot items and products according to claim 1, characterized in that it is made of food grade stainless steel.

* * * * *